United States Patent
Lee et al.

(10) Patent No.: US 8,331,686 B2
(45) Date of Patent: Dec. 11, 2012

(54) METHOD AND APPARATUS FOR EXTRACTING LINE SEGMENTS FROM IMAGE USING INCREMENTAL PIXEL EXTENSION

(75) Inventors: Jae Kwang Lee, Daejeon (KR); Chang Joon Park, Daejeon (KR); Kwang Ho Yang, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 1180 days.

(21) Appl. No.: 12/175,954

(22) Filed: Jul. 18, 2008

(65) Prior Publication Data

US 2009/0046930 A1    Feb. 19, 2009

(30) Foreign Application Priority Data

Aug. 14, 2007 (KR) .................. 10-2007-0081788

(51) Int. Cl.
*G06K 9/46* (2006.01)
*G06K 9/48* (2006.01)

(52) U.S. Cl. .................. 382/199; 382/190; 382/203

(58) Field of Classification Search .......... 382/170–175, 382/181–184, 190, 195, 199, 203
See application file for complete search history.

(56) References Cited

U.S. PATENT DOCUMENTS

| | | | | |
|---|---|---|---|---|
| 5,202,960 A * | 4/1993 | Seiler | ................ | 345/443 |
| 5,416,335 A * | 5/1995 | Forehand | ........... | 250/559.36 |
| 6,361,910 B1 * | 3/2002 | Sarig et al. | ............ | 430/30 |
| 6,574,366 B1 * | 6/2003 | Fan | ................ | 382/201 |
| 6,625,300 B1 * | 9/2003 | Kyo | ................ | 382/104 |
| 6,690,375 B2 * | 2/2004 | Ogawa et al. | ........ | 345/443 |
| 6,792,071 B2 * | 9/2004 | Dewaele | ........... | 378/62 |
| 6,925,206 B2 * | 8/2005 | Akutagawa | ........ | 382/173 |
| 2003/0209660 A1 * | 11/2003 | Kanno | ........... | 250/236 |
| 2004/0066964 A1 * | 4/2004 | Neubauer et al. | ..... | 382/152 |
| 2004/0184674 A1 * | 9/2004 | Lim et al. | ........... | 382/275 |
| 2004/0240737 A1 * | 12/2004 | Lim et al. | ........... | 382/182 |
| 2005/0018878 A1 * | 1/2005 | Paquette et al. | ...... | 382/101 |
| 2005/0058362 A1 * | 3/2005 | Kita | .................. | 382/254 |
| 2008/0260259 A1 * | 10/2008 | Paquette et al. | ...... | 382/203 |
| 2008/0270070 A1 * | 10/2008 | George et al. | ........ | 702/167 |
| 2010/0189360 A1 * | 7/2010 | Okita | ................ | 382/199 |
| 2010/0322522 A1 * | 12/2010 | Wang et al. | ......... | 382/218 |
| 2011/0285873 A1 * | 11/2011 | Showering | ........ | 348/231.99 |
| 2011/0285874 A1 * | 11/2011 | Showering et al. | ..... | 348/231.99 |

OTHER PUBLICATIONS

Poilve "Grouping Straight Line Segments in Real Images" Department of Computer and Information Science University of Pennsylvania (1988) pp. 1-22.*

(Continued)

*Primary Examiner* — David Zarka
*Assistant Examiner* — Mia M Thomas
(74) *Attorney, Agent, or Firm* — Lowe Hauptman Ham & Berner, LLP

(57) ABSTRACT

A method of extracting line segments from a subject image includes calculating a gradient image and a direction image of respective edge pixels in a canny edge image obtained from the subject image, calculating a primary line passing arbitrary two pixels selected among the edge pixels, selecting candidate line segment pixels through performing an incremental pixel extension from a midpoint of the two pixels forming the primary line, and extracting the line segments by checking whether the candidate line segment pixels are connected to each another.

22 Claims, 8 Drawing Sheets

OTHER PUBLICATIONS

"Automatic Detection of Useful Web Images for CBIR System", KyungEun Lim et al., *Korea Multimedia Society*.

Notice of Allowance dated Feb. 18, 2009, for Korean application No. 10-2007-0081788.

Mirmehdi et al.; "Robust Line Segment Extraction Using Genetic Algorithms"; University of Surrey; 5 pages, IPA 1997 Jul. 15-17, 1997 Conference Publication No. 443.

Furukawa et al.; "Accurate and robust line segment extraction by analyzing distribution aroudn peaks in Hough space"; Computer Vision and Image Understanding; pp. 1-25, vol. 92, Issue 1 Oct. 2003.

Aggarwal et al.; "Line Detection in Images Through Regularized Hough Transform"; IEEE Transactions on Image Processing; Mar. 2006; pp. 582-591, IEEE Trans Image Process Mar. 2006 (3).

Grompone von Gioi et al.; "On Straight Line Segment Detection"; CMLA 2007; pp. 1-45, May 2008.

\* cited by examiner

METHOD AND APPARATUS FOR EXTRACTING LINE SEGMENTS FROM IMAGE USING INCREMENTAL PIXEL EXTENSION

CROSS-REFERENCE(S) TO RELATED APPLICATION

The present invention claims priority of Korean Patent Application No. 10-2007-0081788, filed on Aug. 14, 2007, which is incorporated herein by reference.

FIELD OF THE INVENTION

The present invention relates to a method and an apparatus for extracting a line segment from an image using an incremental pixel extension, and more particularly, to a method and apparatus for extracting a line segment from an image by extending a certain edge pixel selected from an edge image to be aligned with a line.

This work was supported by the IT R&D program of MIC/IITA [2006-S-044-02, Development of Multi-Core CPU & MPU-Based Cross-Platform Game Technology].

BACKGROUND OF THE INVENTION

In general, Hough transform is widely used to extract a line from an image. The Hough transform is a method of searching for an extreme point expressing a line segment by transforming a space for an image into a Hough space and of searching for a line from the image using a reverse Hough transform. Researches are being conducted to obtain methods of searching an extreme point in the Hough space.

In an image, the line segment is one of information that may be useful in various fields of image processing. Hence, researches are being actively carried out to search for a line segment from an image. However, the extraction of the line segment from an image cannot be achieved just by searching for features from the image, and no effective methods of extracting a line segment from an image has yet been proposed. Due to this, as one of methods of extracting a line segment from an image, there is the above-mentioned method using a Hough transform may be applied to search for a line segment from an image. However, in a case of searching for a line segment using the Hough transform, more line segments may be searched than are needed to understand an image. In addition, a user must participate to search the for a line segment. Accordingly, it is difficult to automatically search for the line segment from an image.

SUMMARY OF THE INVENTION

It is, therefore, an object of the present invention to provide a method and apparatus of extracting a line segment from an image using an incremental pixel extension in which pixels forming the line segment are searched by incrementally extending pixels about certain edge pixels in a given image and the line segment is reliably searched by using the searched pixels through a weighted line fitting.

In accordance with an aspect of the present invention, there is provided a method of extracting line segments from a subject image including:

calculating a gradient image and a direction image of respective edge pixels in a canny edge image obtained from the subject image;

calculating a primary line passing arbitrary two pixels selected among the edge pixels;

selecting candidate line segment pixels through performing an incremental pixel extension from a midpoint of the two pixels forming the primary line; and extracting the line segments by checking whether the candidate line segment pixels are connected to each another.

In accordance with another aspect of the present invention, there is provided an apparatus for extracting line segments from a subject image, including:

an image preprocessor for calculating a gradient image and a direction image of respective edge pixels of a canny edge image obtained from the subject image; and a line segment extractor for performing an incremental pixel extension for a primary line passing arbitrary two edge pixels selected from the edge pixels to select candidate line segment pixels and checking whether the candidate line segments pixels are connected to each other to extract the candidate line segments pixels which are not connected as the line segments.

BRIEF DESCRIPTION OF THE DRAWINGS

The above and other objects and features of the present invention will become apparent from the following description of embodiments given in conjunction with the accompanying drawings, in which.

DETAILED DESCRIPTION OF THE EMBODIMENTS

Hereinafter, embodiments of the present invention will be described in detail with reference to the accompanying drawings so that they can be readily implemented by those skilled in the art.

Figure 1:
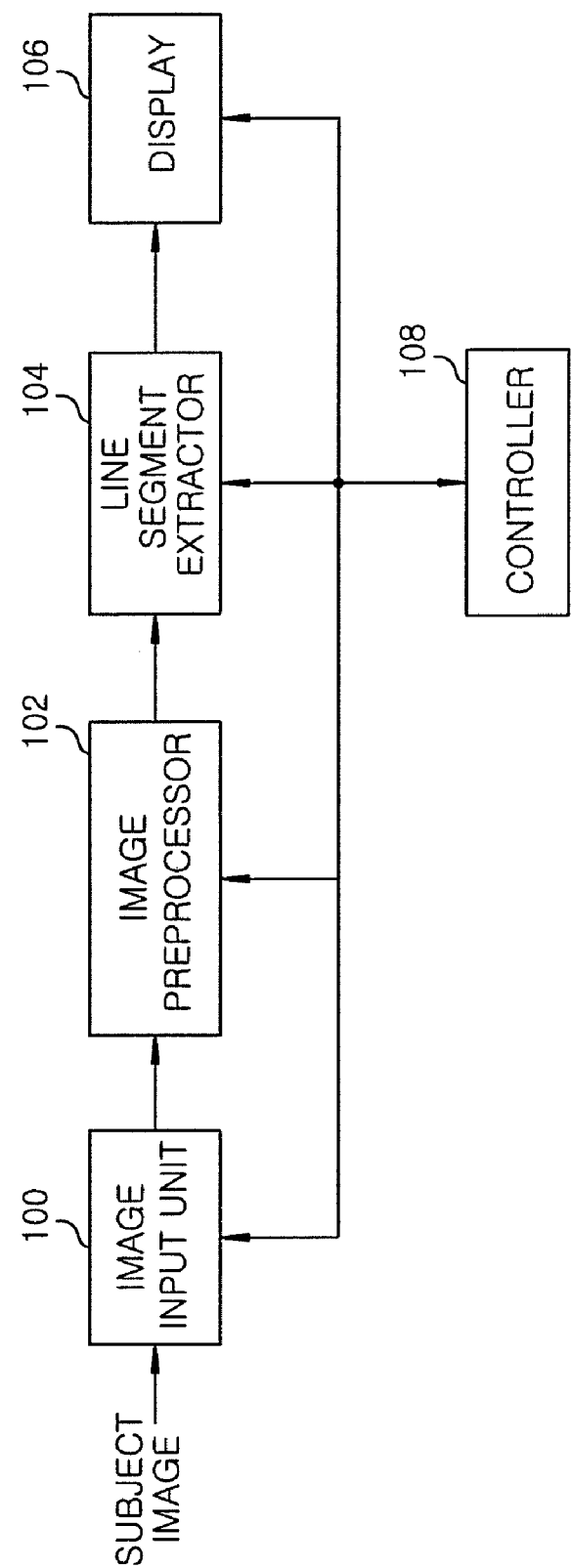
FIG. 1 is a block diagram illustrating an apparatus for extracting a line segment from an image using an incremental pixel extension in accordance with an embodiment of the present invention.

FIG. 1 is a block diagram illustrating an apparatus for extracting a line segment from an image using an incremental pixel extension in accordance with an embodiment of the present invention. The line segment extracting apparatus as shown in FIG. 1 includes an image input unit 100, an image preprocessor 102, a line segment extractor 104, a controller 108, and a display 106.

The image input unit 100 receives a subject image from which the line segment is extracted and applies the subject image to the image preprocessor 102.

The image preprocessor 102 obtains a canny edge image from the subject image and then calculates a gradient image and a direction image, with respect to each edge image of the canny edge image. The canny edge image, the gradient image, and the direction image are applied to the line segment extractor 104. The obtaining of the canny edge image is a basic concept of image processing known in the art of the present invention, and therefore, a description thereof will be omitted.

The line segment extractor 104 obtains a primary line passing two arbitrary pixels among edge pixels of the canny edge image, and selects candidate line segment pixels by performing an incremental pixel extension from a midpoint between the two pixels on the primary line. Further, the line segment extractor 104 weights the candidate line segment pixels to perform a weighted line fitting, and extracts the line segment by inspecting the connection between the candidate line segment pixels.

In more detail, the midpoint between the two pixels on the primary line is taken to primarily select candidate line segment pixels within a certain radius by performing the incremental pixel extension from the midpoint. Next, new candidate line segment pixels are selected such a manner that distance and orientation errors of the primarily selected candidate line segment pixels to the primary line are calculated to secondly selected candidate line segment pixels within a preset range of the distance and orientation errors. Then, a weight representing a relationship of the primary line to the secondly selected candidate line segment pixels is calculated and the weighted line fitting is performed on the secondly selected candidate line segment pixels, thereby obtaining a new line. Other new candidate line segment pixels are selected by performing the incremental pixel extension based on the new line, and the other new candidate line segment pixels are subjected to the incremental line fitting again. Next, sums of the weights of the respective candidate line segment pixels of the two lines are compared with each other to check whether the candidate line segment pixels are connected to each other. The connection between the candidate line segment pixels of the two lines is determined when a sum of weights of a previous line is greater than a sum of weights of a new line. Using this determination, the candidate line segment pixels of the two lines that are not connected to each other are extracted as line segments.

The controller 108 controls respective components of the line segment extracting apparatus. Further, the controller 108 displays the line segments extracted by the line segment extractor 104 through the display 106 and allows a user to use the image from which the line segments are extracted when there is a request from the user.

Figure 2:
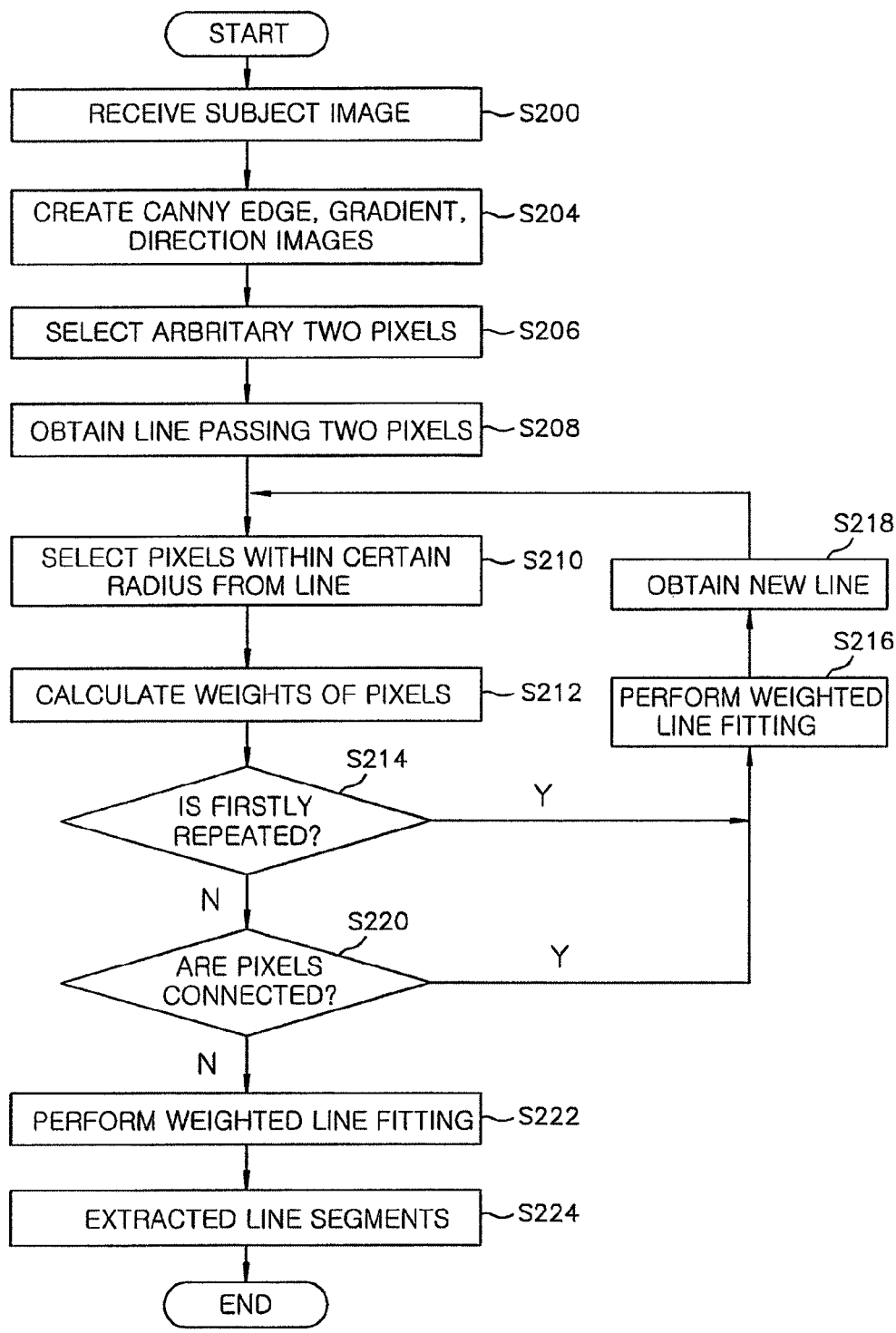
FIG. 2 is a flowchart illustrating the extraction of a line segment carried out by the line segment extracting apparatus of FIG. 1.

FIG. 2 is a flowchart illustrating operation of the line extracting apparatus of FIG. 1 for performing the incremental pixel extension.

Hereinafter, embodiments of the line segment extracting apparatus will be described with reference to FIGS. 1 and 2 in detail.

Figure 3:
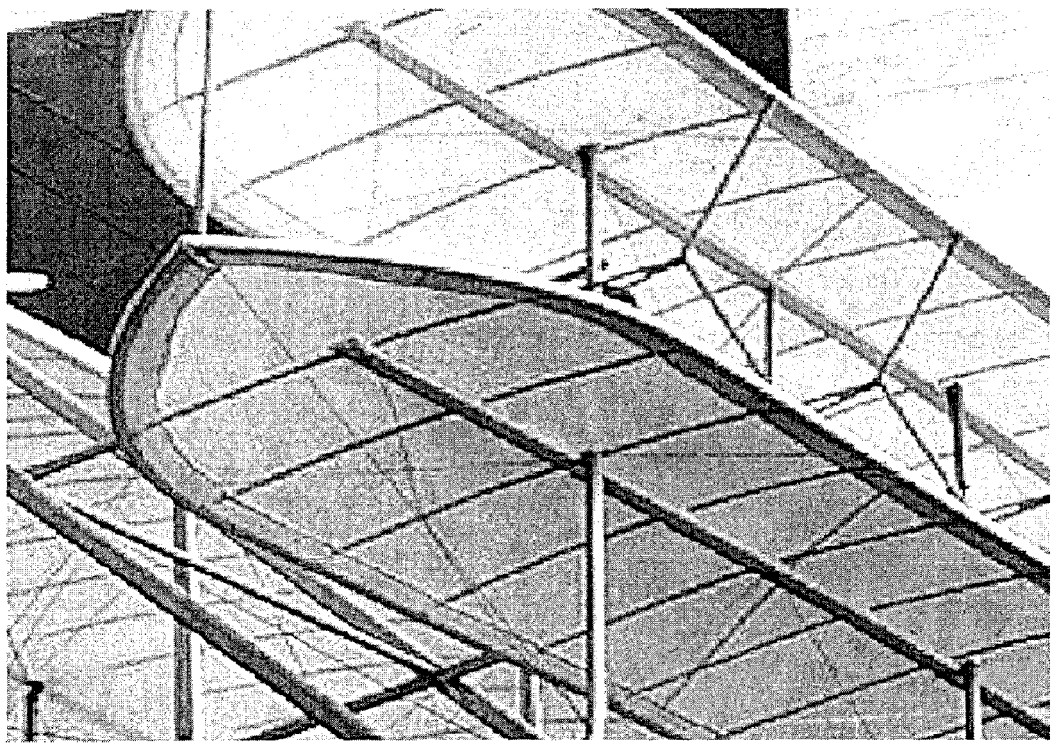
FIG. 3 is an exemplary view illustrating an original image containing a line segment to be inputted to the line segment extracting apparatus of FIG. 1.

First, in step S200, a subject image containing lines as shown in FIG. 3 is provided to the image preprocessor 102 through the image input unit 100.

Figure 4:
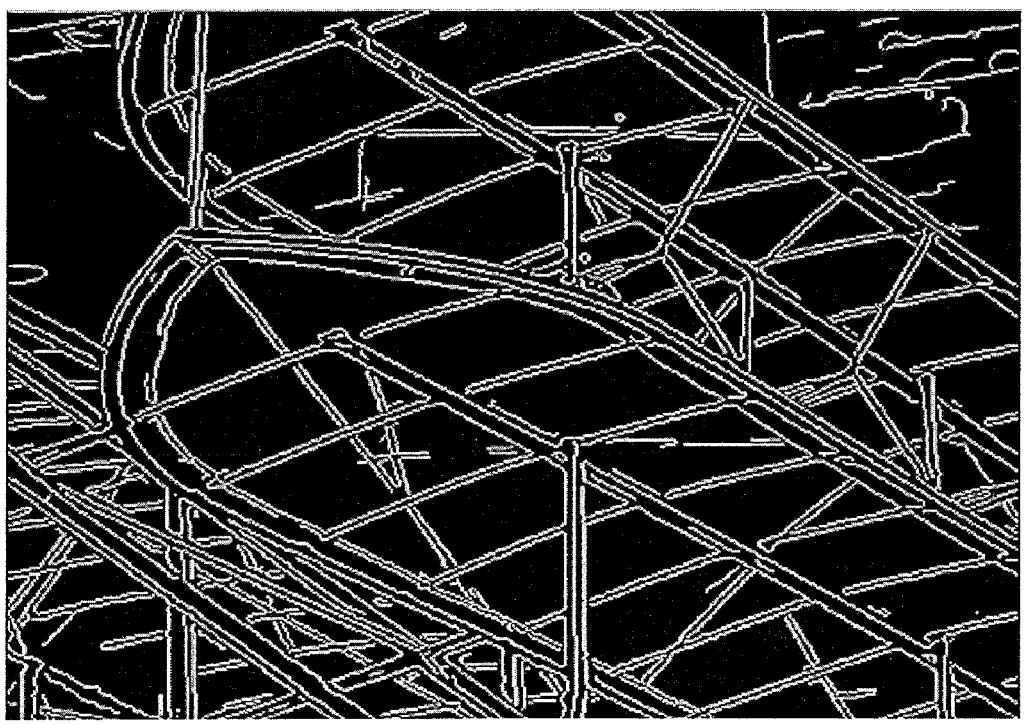
FIG. 4 is an exemplary view illustrating a canny edge image created by the line segment extracting apparatus of FIG. 1.

Then, in step S204, a canny edge image is created from the subject image by the image preprocessor 102 as illustrated in FIG. 4, and gradient image and direction image are calculated with respect to the respective edge pixels in the canny edge image. Moreover, the gradient image is convoluted with respect to the X-axis and Y-axis with a Gaussian kernel and is then created as an X-axis gradient image and a Y-axis gradient image. Let's that the X-axis gradient image is dxIm and the Y-axis gradient image is dyIm, a direction image dirIm can be expressed by the following equation.

$$dirIm = \tan^{-1}\left(\frac{dyIm}{dxIm}\right) \quad \text{Eq. (1)}$$

The direction image is an image with one value of angle for each edge pixel. The reason why the direction image is created is to easily obtain a direction vector corresponding to a certain selected pixel when the pixel is selected from a plurality of edge pixels. When an angle of the direction image is θ, the direction vector of the edge $\vec{d}$ can be expressed as follows.

$$\vec{d} = (\sin(\theta), -\cos(\theta)) \quad \text{Eq. (2)}$$

The direction vector of the edge pixel is a unit vector with a magnitude 1 (one).

Thereafter, in order to extract line segments using the canny edge image, the gradient image, and the direction image, certain pixels on an edge are selected as follows.

Hereinafter, the extraction of line segments wherein the line segment extractor 104 selects arbitrary two pixels on an edge and extracts the line segments will be described in detail.

In step S206, if an edge pixel p1 is selected, another edge pixel p2 can be obtained by adding a direction vector $\vec{d}$ indicating the direction of the edge pixel to the selected pixel p1.

And then, in step S208, a primary line passing the pixels p1 and p2 can be calculated as follows.

$$\vec{n} \cdot \vec{x} + c = 0 \quad \text{Eq. (3)}$$

Figure 5:
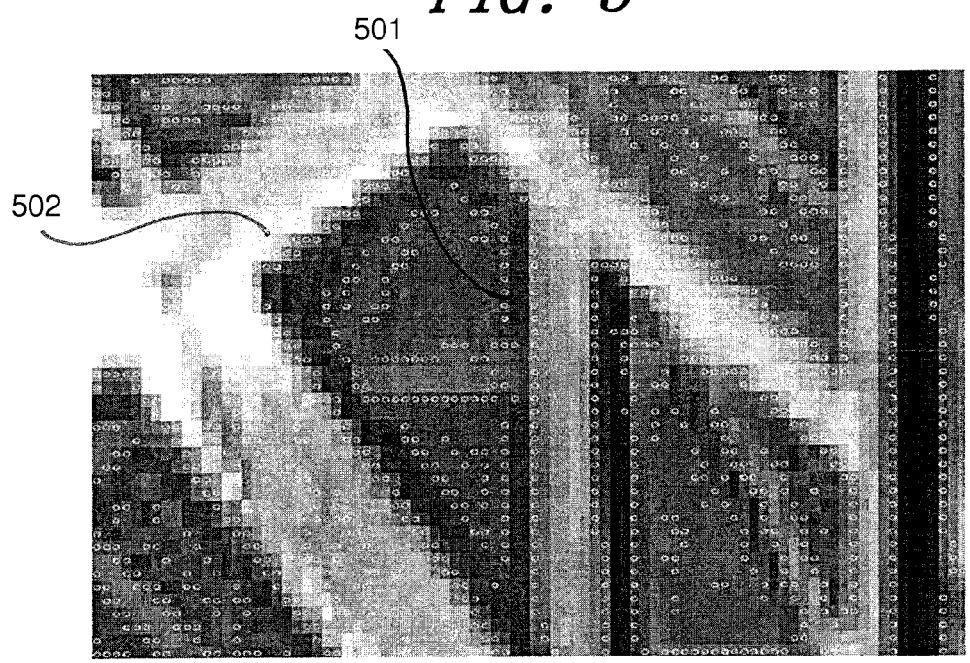
FIG. 5 is an exemplary view illustrating an image of initialized early line created by the line segment extracting apparatus of FIG. 1.

Here, $\vec{n}$ is a normal vector of a currently selected edge pixel, which is expressed by $(\cos(\theta), \sin(\theta))$, and $\vec{x}$ is a coordinate of the currently selected pixel 502. The edge pixels p1 and p2 and the primary line 501 connecting the edge pixels p1 and p2 are depicted as illustrated in FIG. 5.

Thereafter, for the incremental pixel extension, a midpoint between the edge pixels p1 and p2 is taken and pixels within a certain radius from the midpoint are then selected. Among the selected pixels, the pixels within a preset range from the primary line are then selected as candidate line segment pixels in step S210. In order to select the pixels within the preset range, the following error equation is used.

$$err = \vec{n} \cdot \vec{x} + c$$

$$errOrient = \vec{n} \cdot \vec{d} \quad \text{Eq. (4)}$$

Here, the term "err" represents an error between the primary line and the pixels and the term "errOrient" represents an orientation error.

After that, in step S212, the selected pixels are given with a weight L expressed as follows to represent how closely the candidate line segment pixels relate to the primary line.

$$L = \exp\left(-\frac{1}{2}\left(\frac{err^2}{\sigma_x^2} + \frac{errOrient^2}{\sigma_d^2}\right)\right)$$ Eq. (5)

Here, $\sigma_X$ and $\sigma_d$ represent sigma values with respect to coordinate and direction, respectively, and values $\sigma_X=1$ and $\sigma_d=0.1$ are used.

Accordingly, the weight L is obtained for each selected pixel. If exp[ ] of the obtained weight L is greater than −2, the obtained weight L is used as the weight to a corresponding pixel. However, If exp[ ] of the obtained weight L is less than −2, the obtained weight L is set to 0 (zero).

Figure 6:
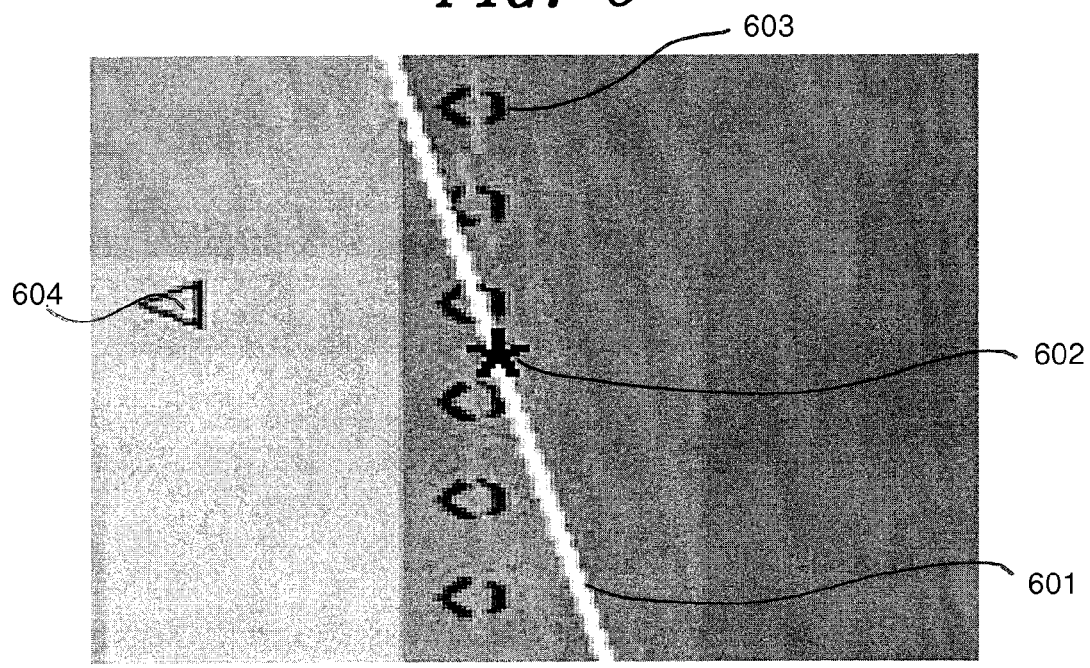
FIG. 6 is an exemplary view illustrating an image of an extended pixel created by a first repetition in the line segment extracting apparatus of FIG. 1.

FIG. 6 illustrates pixels with weight of 0 (zero) and pixels with weight of non-zero. In other words, pixels 604 with weight 0 are denoted as a triangle and pixels 603 with weight of non-zero are denoted as a circle.

Subsequently, a sum of weights of the selected edge pixels is calculated.

Thereafter, in step S214, without determining whether or not the selected edge pixels are connected with another, it is determined whether the calculation of the sum of weights is firstly repeated.

If it is determined that the calculation is firstly repeated, a control process goes to step S216 where the weighted line fitting is performed on the selected pixels 602 having the weight of non-zero to thereby define a new line 601. The weighted line fitting is performed by weighted least square fitting.

After that, in step S218, the new line is calculated newly and. As such, when the new line is calculated, the line segment extractor 104 performs again the incremental pixel extension to the new line and repeats the steps S210 to S212 as follows.

Firstly, a midpoint between the selected pixels in the previous step is calculated and an image boundary is created for the incremental pixel extension. The image boundary is defined by pixels spaced away by one pixel in the normal direction of the new line and by three pixels from the edge direction, using a normal vector $\vec{n}$ and direction vector $\vec{d}$ indicating an edge direction, which are newly calculated at this stage. And the pixels within the image boundary are newly selected.

Thereafter, weights for the newly selected pixels are calculated, and a sum of weights is calculated in the same manner as described above.

For convenience, let's the sum of weights obtained in the previous first repetition is set to prevsumW and the sum of weights obtained in the current repetition is set to sumW. And then, in step S220, the two sums of weights sumW and prevsumW are compared in order to determine whether the newly selected pixels are connected.

If the sum of weights prevsumW for the previously selected edge pixels is greater than the sum of weights sumW for the currently selected edge pixels, it is determined that the candidate line segments of the two lines are connected to each other. Accordingly, a control process returns to the steps S216 to S214 for repeatedly performing the above operation.

Figure 7:
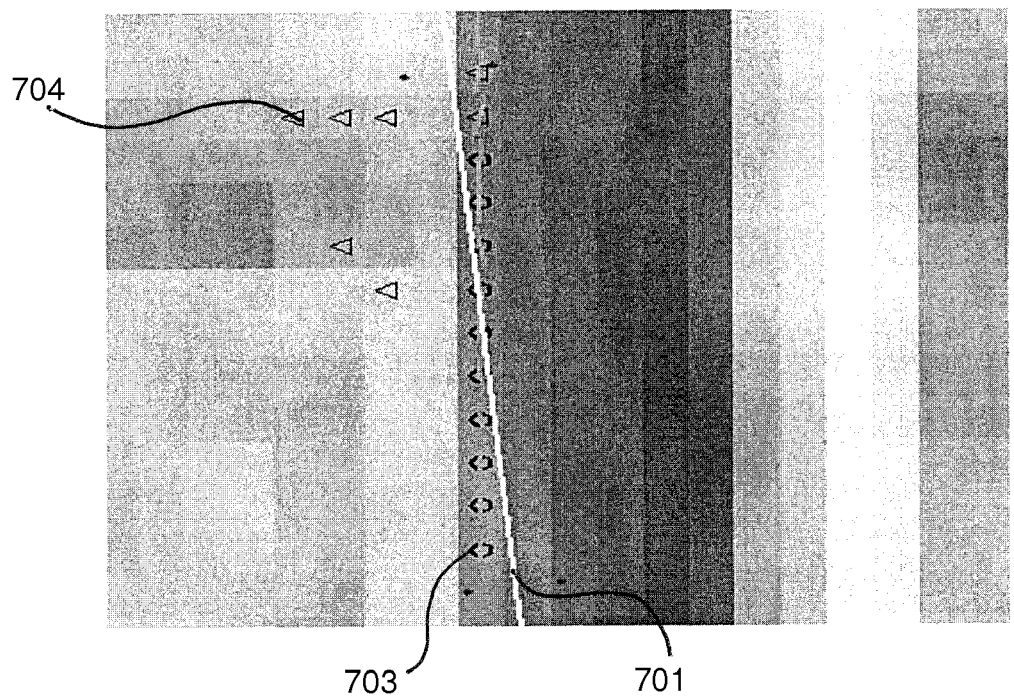
FIG. 7 is an exemplary view illustrating an image of an extended pixel created by a second repetition in the line segment extracting apparatus of FIG. 1.
Figure 8:
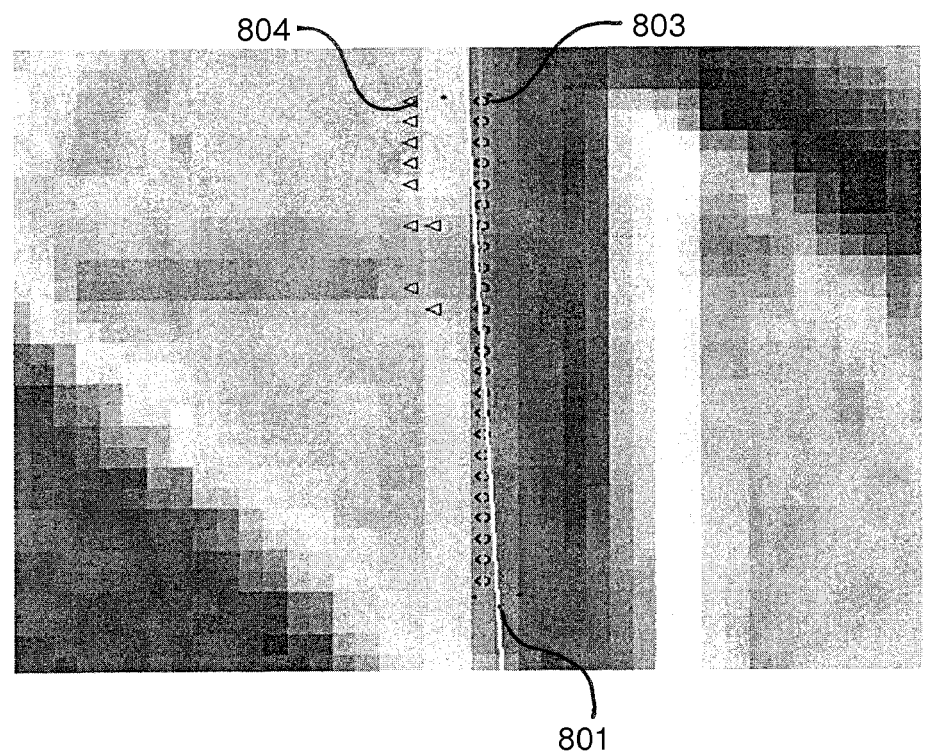
FIG. 8 is an exemplary view illustrating an image of an extended pixel created by a fourth repetition in the line segment extracting apparatus of FIG. 1.
Figure 9:
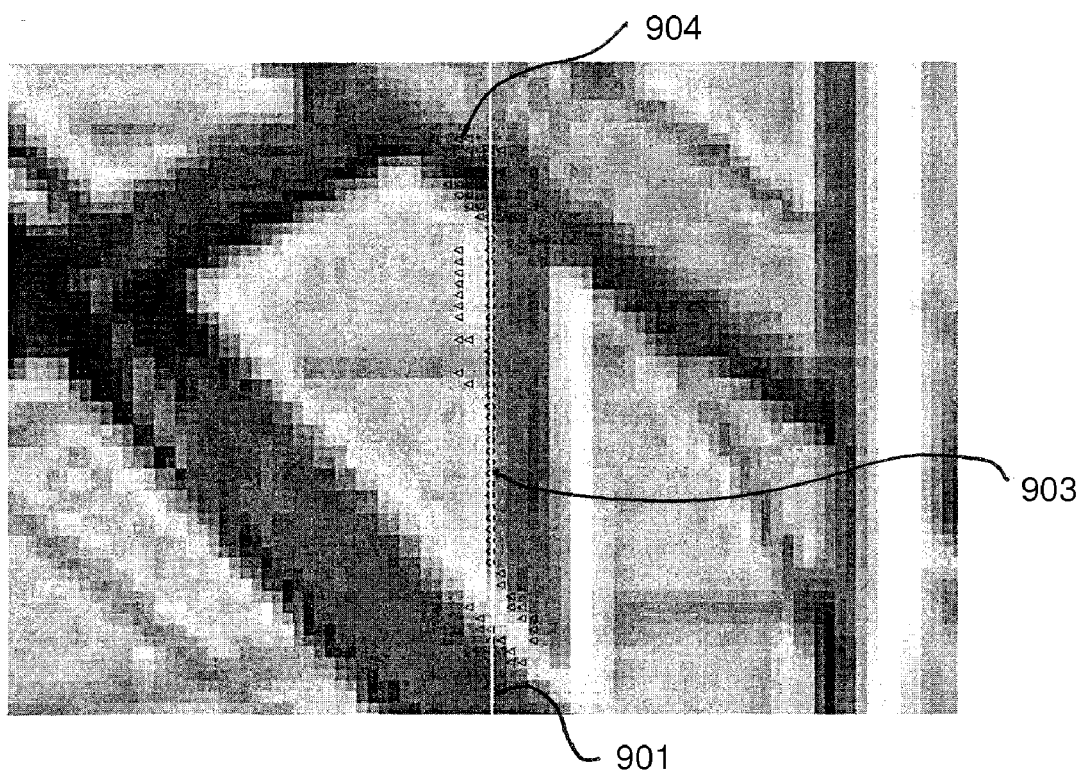
FIG. 9 is an exemplary view illustrating an image of an extended pixel created by a fifth repetition in the line segment extracting apparatus of FIG. 1.

If, however, the sum of weights prevsumW for the previously selected edge pixels 703 is less or equal to the sum of weights sumW for the currently selected edge pixels 704 in the step S220, it means that either none of pixels are further added or only pixels having the weight of zero are added. That is, it is considered that none of edge pixels are further connected to each other. FIGS. 7 to 9 illustrate lines 701-901 and pixels 703-903, which are newly calculated and selected, and pixels 704-904 with weights of zero when second, fourth, and fifth repetitions are performed. In FIGS. 7 to 9, pixels 704-904 with weight 0 are denoted as a triangle and pixels 703-903 with weight of non-zero are denoted as a circle.

Based on the determination, the candidate line segments of the two lines which had connected to each another are extracted as line segments. As such, if it is determined that the candidate line segment pixels are not connected to each other, the line segments may be considered broken. Next, in step S222, the weighted line fitting is performed using the previously and newly selected pixels.

Figure 10:
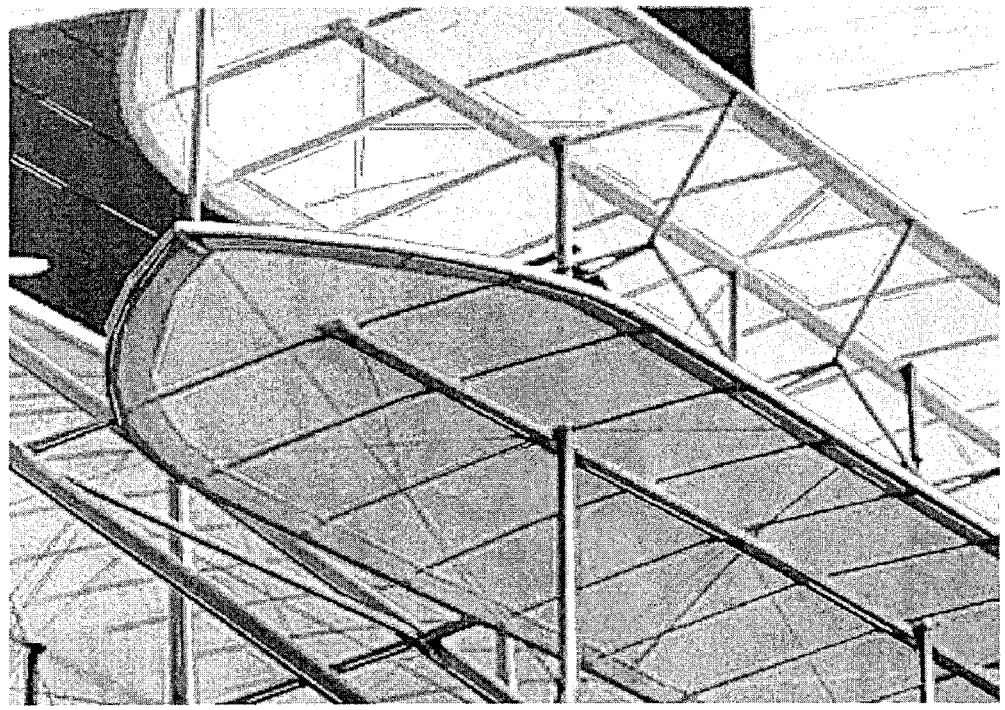
FIG. 10 is an exemplary view illustrating an image of an extended pixel created by an incremental pixel extension in the line segment extracting apparatus of FIG. 1.

Subsequently, in step S224, line segments are calculated for the previously and newly selected pixels to which the weighted line fitting is performed, thereby extracting the line segment from the subject image. FIG. 10 illustrates a result of extraction of line segments from the subject image.

As described above, the present invention, for the extraction of line segments from a subject image, provides a method and apparatus for finding pixels forming line segments by incrementally extending pixels from a certain edge pixel in a canny image and for reliably obtaining line segments by performing weighted line fitting using the found pixels. Although it is difficult to extract the line segments from an image, the extraction of line segments by the method of the present invention is very reliable and can be automatically performed so that the method and apparatus of the present invention are useful when using features as well as line segments in an image like for self-calibration of a camera.

While the invention has been shown and described with respect to the embodiments, it will be understood by those skilled in the art that various changes and modifications may be made without departing from the scope of the invention as defined in the following claims.

What is claimed is:

1. A method of extracting line segments from a subject image comprising:
   calculating a gradient image and a direction image of respective edge pixels in a canny edge image obtained from the subject image;
   calculating a primary line passing arbitrary two pixels selected among the edge pixels;
   selecting candidate line segment pixels through performing an incremental pixel extension from a midpoint of the, arbitrary two pixels forming the primary line; and
   extracting the candidate line segments by calculating weights representing a relationship of the candidate line segment pixels with the primary line, performing a weighted line fitting on candidate line segment pixels to calculate a new line, and checking whether the candidate line segment pixels are connected to each another.

2. The method of claim 1, wherein calculating the primary line comprises:
   selecting a first edge pixel from the edge pixels; and
   selecting a second edge pixel by adding a direction vector indicating the direction of the first edge pixel to the first edge pixel.

3. The method of claim 2, wherein each the primary line and the new line is calculated from the following equation, $$\vec{n}\cdot\vec{x}+c=0$$

where $\vec{n}$ is a normal vector of the selected edge pixel, $\vec{x}$ is a coordinate of the selected pixel, and c is a constant.

4. The method of claim 1, wherein selecting the candidate line segment pixels comprises:
   performing the incremental pixel extension from the midpoint between the two edge pixels forming the line to firstly select edge pixels within a preset radius as the candidate line segments; and calculating a distance error and an orientation error between the line and the firstly selected edge pixels to secondly selected edge pixels within a preset range, the firstly and secondly selected edge pixels being the candidate line segment pixels.

5. The method of claim 4, wherein the distance error and the orientation error are obtained from the following equations:

$$err = \vec{n} \cdot \vec{x} + c$$

$$errOrient = \vec{n} \cdot \vec{d}$$

where the term of 'err' represent the distance error, and the term of 'errOrient' represent the orientation error.

6. The method of claim 1, wherein extracting the line segments further comprises:

selecting new candidate line segment pixels through the incremental pixel extension for the new line and repeating the weighted line fitting on the new candidate line segment pixels;

comparing sums of weights of the candidate line segment pixels of the two lines to determined whether the candidate line segment pixels are connected to each other; and extracting the line segments if it is determined that the candidate line segment pixels of the two lines are not connected to each other.

7. The method of claim 6, wherein weights (L) of the candidate line segment pixels are obtained from the following equation, $$L = \exp\left(-\frac{1}{2}\left(\frac{err^2}{\sigma_x^2} + \frac{errOreint^2}{\sigma_d^2}\right)\right)$$

where axis $\sigma_x$ is a value of sigma with respect to a coordinate, and $\sigma_d$ is a value of sigma with respect to direction.

8. The method of claim 6, wherein it is determined that the candidate line segment pixels of the two lines are connected to each another when a sum of weights of the primary line is greater than that of weights of the new line.

9. The method of claim 1, wherein the gradient image comprises an X-axis gradient image and a Y-axis gradient image, created by convoluting the edge pixels to the X-axis and Y-axis using a Gaussian kernel.

10. The method of claim 9, wherein the direction image has one value of angle for each edge pixel and is obtained using the X-axis gradient image and the Y-axis gradient image from the following equation, $$dirIm = \tan^{-1}\left(\frac{dyIm}{dxIm}\right)$$

where dirIm is the direction image, dxIm is the X-axis gradient image, and dyIm is the Y-axis gradient image.

11. The method of claim 10, wherein the direction vector is obtained from the following equation, $$\vec{d} = (\sin\theta, -\cos\theta)$$

where $\vec{d}$ is the direction vector of the edge pixel, and $\theta$ is an angle of the direction image.

12. An apparatus for extracting line segments from a subject image, comprising:

an image preprocessor for calculating a gradient image and a direction image of respective edge pixels of a canny edge image obtained from the subject image; and a line segment extractor for performing an incremental pixel extension for a primary line passing arbitrary two edge pixels selected from the edge pixels to select candidate line segment pixels and checking whether the candidate line segments pixels are connected to each other to extract the candidate line segments pixels which are not connected as the line segments, wherein the line segment extractor calculates weights representing a relationship of the candidate line segment pixels with the primary line, performs a weighted line fitting on the candidate line segment pixels to calculate a new line, selects new candidate line segment pixels through the incremental pixel extension for the new line, performs the weighted line fitting on the new candidate line segment pixels.

13. The apparatus of claim 12, wherein the line segment extractor performs the incremental pixel extension from the midpoint between the two pixels to firstly select edge pixels within a preset radius, and calculates a distance error and an orientation error between the primary line and the firstly selected edge pixels to secondly selected pixels within a preset range, the firstly and secondly selected pixels being the candidate line segment pixels.

14. The apparatus of claim 13, wherein the distance error and the orientation error are obtained from the following equations:

$$err = \vec{n} \cdot \vec{x} + c$$

$$errOrient = \vec{n} \cdot \vec{d}$$

where the term of 'err' represent the distance error, and the term of 'errOrient' represent the orientation error.

15. The apparatus of claim 13, wherein the line segment extractor compares sums of weights of the candidate line segment pixels of the two lines to determine whether the candidate line segment pixels are connected to each other.

16. The apparatus of claim 15, wherein weights (L) of the secondly selected candidate line segment pixels are obtained from the following equation, $$L = \exp\left(-\frac{1}{2}\left(\frac{err^2}{\sigma_x^2} + \frac{errOreint^2}{\sigma_d^2}\right)\right)$$

where $\sigma_x$ is a value of sigma with respect to a coordinate, and $\sigma_d$ is a value of sigma with respect to direction.

17. The apparatus of claim 16, wherein it is determined that the candidate line segment pixels of the two lines are connected to each other when a sum of weights of the primary line is greater than that of weights of the new line.

18. The apparatus of claim 12, wherein the arbitrary two edge pixels comprise a first pixel arbitrary selected from the edge pixels, and a second pixel obtained by adding a direction vector of the first edge pixel to the first edge pixel.

19. The apparatus of claim 18, wherein each of the primary line and the new line the first and second candidate line segment pixels is calculated from the following equation, $$\vec{n} \cdot \vec{x} + c = 0$$

where $\vec{n}$ is a normal vector of the selected edge pixel, $\vec{x}$ is a coordinate of the selected edge pixel, and c is a constant.

20. The apparatus of claim 12, wherein the gradient image comprises an X-axis gradient image and a Y-axis gradient image, which are created by convoluting the edge pixels to the X-axis and Y-axis using a Gaussian kernel.

21. The apparatus of claim 20, wherein the direction image has one value of angle for each edge pixel and is obtained using the X-axis gradient image and the Y-axis gradient image from the following equation, $$dirIm = \tan^{-1}\left(\frac{dyIm}{dxIm}\right)$$

where dirIm is the direction image, dxIm is the X-axis gradient image, and dyIm is the Y-axis gradient image.

22. The apparatus of claim 21, wherein the direction vector is obtained from the following equation.

$$\vec{d} = (\sin\theta, -\cos\theta)$$

where $\vec{d}$ is the direction vector of the edge pixel, and $\theta$ is an angle of the direction image.

* * * * *